US005693188A

United States Patent [19]
Donnohue et al.

[11] Patent Number: 5,693,188
[45] Date of Patent: Dec. 2, 1997

[54] HYDROCARBON THERMAL PROCESSING APPARATUS

[75] Inventors: James R. Donnohue, Huntsville, Ark.; John Edgar Coltman, Westbank, Canada

[73] Assignee: Unique Tire Recycling (Canada) Inc., Kamloops, Canada

[21] Appl. No.: 745,245

[22] Filed: Nov. 8, 1996

Related U.S. Application Data

[63] Continuation of Ser. No. 266,453, Jun. 27, 1994, abandoned.

[51] Int. Cl.$^6$ ................... C10B 7/10; C10G 1/00
[52] U.S. Cl. ................... 202/118; 48/92; 201/3; 201/11; 201/25; 202/219; 202/226; 202/129
[58] Field of Search ................... 202/117, 118, 202/128, 219, 269, 226, 129, 262; 201/3, 25, 11, 32; 48/92

[56] References Cited

U.S. PATENT DOCUMENTS

| | | | |
|---|---|---|---|
| 4,056,461 | 11/1977 | Unverferth | 202/117 |
| 4,098,648 | 7/1978 | Kraemer et al. | 196/14.52 |
| 4,123,332 | 10/1978 | Rotter | 201/25 |
| 4,126,519 | 11/1978 | Murray | 202/118 |
| 4,210,491 | 7/1980 | Schulman | 202/118 |
| 4,357,231 | 11/1982 | Estes et al. | 208/404 |
| 4,406,742 | 9/1983 | Dick | 196/14.52 |
| 4,477,257 | 10/1984 | Koppelman et al. | 44/632 |
| 4,686,008 | 8/1987 | Gibson | 202/118 |
| 4,690,732 | 9/1987 | Everman et al. | 202/118 |
| 4,900,401 | 2/1990 | Horton | 201/25 |
| 4,925,532 | 5/1990 | Meuser et al. | 202/219 |
| 5,085,738 | 2/1992 | Harris et al. | 201/11 |
| 5,129,995 | 7/1992 | Agarwal | 201/21 |
| 5,464,503 | 11/1995 | Auetisian et al. | 202/118 |

FOREIGN PATENT DOCUMENTS

| | | | |
|---|---|---|---|
| 0 025 319 | 3/1981 | European Pat. Off. | |
| 2061473 | 5/1981 | United Kingdom | 202/118 |
| 86 00331 | 1/1986 | WIPO | |

*Primary Examiner*—Virginia Manoharan
*Attorney, Agent, or Firm*—Griffin, Butler, Whisenhunt & Kurtossy; Dalesman & Company

[57] ABSTRACT

Apparatus for the thermal conversion of solids containing hydrocarbons. In one embodiment for solids which can be converted entirely to vapour, pieces of the solids are continually fed into a molten lead bath in an oxygen free atmosphere in an elongated conversion chamber. An auger partially immersed in the lead bath carries the floating pieces along in the molten lead bath until they are gradually converted to hydrocarbon vapour which rises upwardly to a condenser. In another embodiment for solids which can be converted to a vapour, particulate matter and residual solids, the lead bath extends further into a separation chamber with an inclined retaining skirt extending between the conversion chamber and the separation chamber. The auger forces the particulate matter and residual solids remaining after vaporization down under the inclined skirt, but the hydrocarbon vapour is prevented from escaping into the separation chamber. A scraper mechanism draws the remaining particulate matter and residual solids out of the molten lead bath up along an inclined surface. Inert gas blown through a screen in the inclined surface separates the particulate matter from the residual solids. The particulate matter is carried upwardly to a collector and the residual solids drop down through a residual solids outlet.

8 Claims, 3 Drawing Sheets

5,693,188

HYDROCARBON THERMAL PROCESSING APPARATUS

This application is a continuation of Ser. No. 08/266,453, filed Jun. 27, 1994, now abandoned.

BACKGROUND OF THE INVENTION

This invention relates to the thermal conversion of solids containing hydrocarbons into a vapor and possibly also other constituents such as particulate matter and residual solids.

The disposal of organic materials such as vehicle tires and numerous plastic products have become more and more of a problem. They are not accepted at many landfills because they decompose very slowly, if at all, and may produce contaminating products. While it is known to thermally convert organic solids to their reusable constituents in a batch process, this has been found to be very inefficient.

U.S. Pat. Nos. 4,925,532 to Meuser et al. which issued May 15, 1990 and 5,085,738 to Harris et al. which issued Feb. 4, 1992 do disclose apparatus for continuous feed pyrolysis processes having an oxygen free atmosphere over a molten metal bath in which organic solids are thermally converted to hydrocarbon vapors, particulate matter and residual solids. However, both of these processes have been found to have too many operational problems to be commercially viable. The problems include difficulties with the separation and removal of particulate matter and residual solids and, referring particularly to the apparatus in U.S. Pat. No. 5,085,738, difficulties in maintaining an oxygen free atmosphere over the molten metal bath while continually feeding the organic solids therein and high maintenance.

SUMMARY OF THE INVENTION

Accordingly, it is an object of the present invention to at least partially overcome the disadvantages of the prior art by providing apparatus for thermal processing solids containing hydrocarbon wherein pieces of the solids continually fed into a conversion chamber float in a heated liquid bath and are conveyed along in a substantially oxygen free atmosphere during conversion.

To this end, in one of its aspects, the invention provides thermal processing apparatus for thermally converting solids containing hydrocarbon to vapor comprising an elongated conversion chamber with a first end and a second end, the conversion chamber being filled to a predetermined level with a heated liquid bath having a predetermined temperature with a substantially oxygen free vapor collection portion extending above the liquid bath to a vapor outlet, the improvement comprising feed means to continually feed pieces of the solids containing hydrocarbon into the liquid bath through an inlet at the first end of the conversion chamber whereby the pieces of solids float in the heated liquid bath, and conveying means extending from the first end of the conversion chamber to continually move the pieces of solids floating in the heated liquid bath along the elongated conversion chamber until conversion to a vapor occurs.

In another of its aspects, the invention provides thermal processing apparatus for thermally converting solids containing hydrocarbon to vapor, particulate matter and residual solids comprising an elongated conversion chamber with a first end and a second end, the conversion chamber being filled to a predetermined level with a heated liquid bath having a predetermined temperature with a substantially oxygen free vapor collection portion extending above the liquid bath to a vapor outlet, the improvement comprising feed means to continually feed pieces of the solids containing hydrocarbon into the liquid bath through an inlet at the first end of the conversion chamber whereby the pieces of solids float in the heated liquid bath, and conveying means extending from the first end of the conversion chamber to continually move the pieces of solids floating in the heated liquid bath along the elongated conversion chamber until conversion to a vapor occurs, a first solids retaining screen extending along the conversion chamber above the auger, the first solids retaining screen having a semicircular cross-section to fit around and be spaced a predetermined distance from an upper portion of the auger a separation chamber extending from the second end of the conversion chamber, the heated liquid bath extending into the separation chamber with a vapor retaining skirt inclined downwardly into the heated liquid bath between the conversion chamber and the separation chamber to prevent the vapor escaping from the vapor collection portion of the conversion chamber into the separation chamber while the particulate matter and residual solids remaining in the conversion chamber after removal of the vapor are forced by the auger downwardly into the heated liquid bath beneath the inclined skirt into the separation chamber, and separation means in the separation chamber to remove the particulate matter and residual solids from the heated liquid bath and separate the particulate matter from the residual solids, with the particulate matter flowing to a particulate matter collector and the residual solids dropping downwardly to a residual solids outlet.

Further objects and advantages of the invention will appear from the following description taken together with the accompanying drawings.

DETAILED DESCRIPTION OF THE INVENTION

Figure 1:
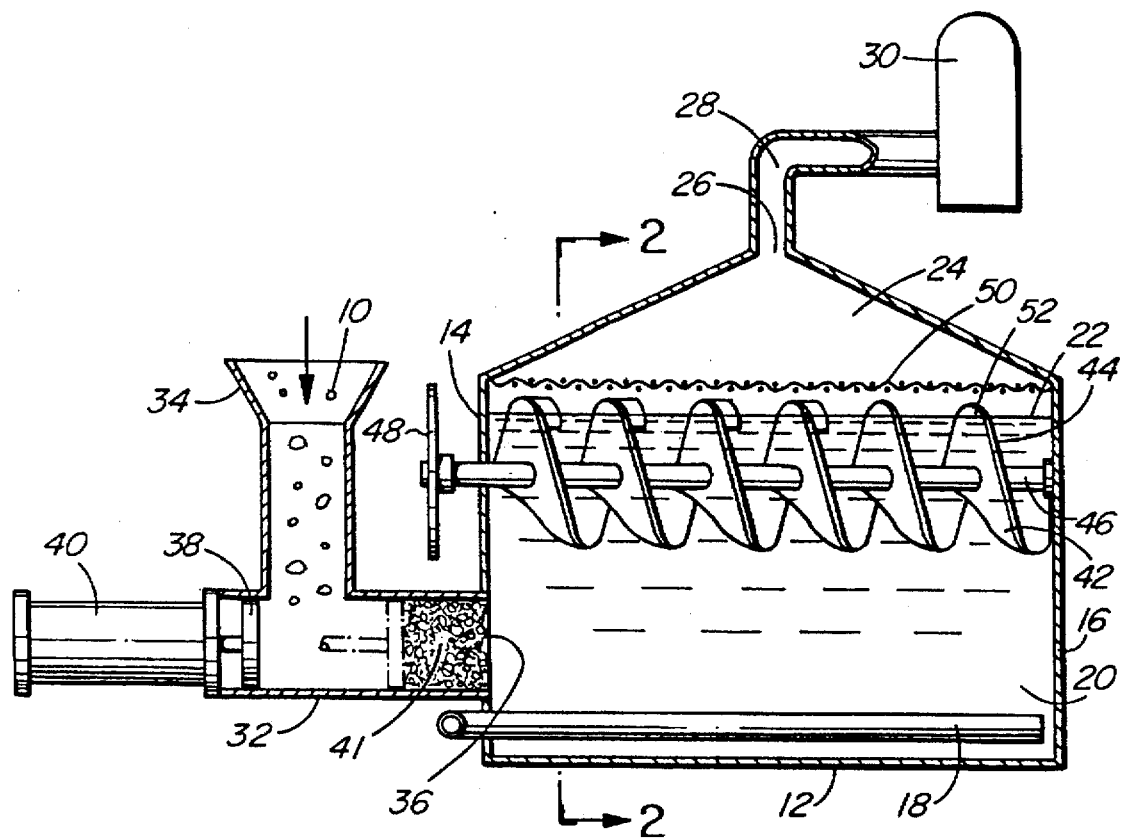
FIG. 1 is a partial sectional view of apparatus having a conversion chamber according to one embodiment of the invention.
Figure 2:
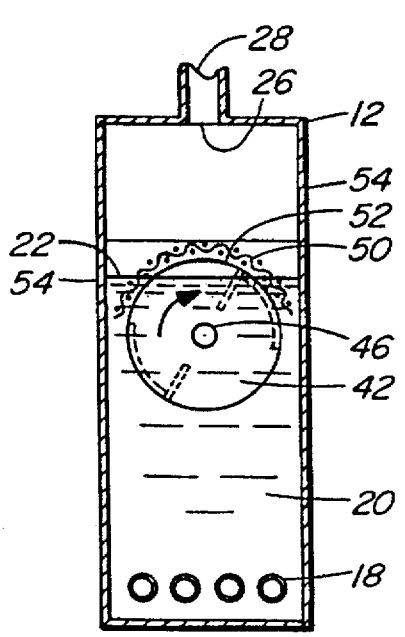
FIG. 2 is a cross-sectional view along line 2—2 in FIG. 1.

Reference is first made to FIGS. 1 and 2 which show apparatus according to one embodiment of the invention for the thermal conversion of solids containing hydrocarbon. In this case, the solids such as pieces of various types of plastic 10 which are fed into an elongated conversion chamber 12 are entirely converted to a vapor and no separation chamber is required. As can be seen, the conversion chamber 12 has a first end 14 and a second end 16 with gas heater pipes 18 extending therein to heat a liquid bath 20 to a predetermined temperature. In this case, the liquid bath 20 is molten lead and the temperature is between 850° F. and 950° F. In other embodiments, the liquid bath 20 can be a different suitable material such as aluminium nitrite with the same or a different predetermined temperature depending upon the thermal characteristics of the material being processed. The molten lead bath 20 has an upper surface 22 at a predetermined level in the conversion chamber 12. The conversion chamber 12 has a vapor collection portion 24 extending above the molten lead bath 20 to a vapor outlet 26 with a pipe 28 leading to a hydrocarbon condenser 30. The condenser 30 is cooled in a conventional way to condense at least most of the heavier hydrocarbons received and includes collection tanks (not shown). Although not shown for ease of illustration, some of the recovered hydrocarbons can be pumped to the heater pipes 18 and burned to maintain the temperature of the molten lead bath 20.

A feeder 32 receives the pieces of plastic 10 through a hopper 34. In this embodiment, the pieces of plastic 10 are continually fed into the molten lead bath 20 through an inlet 36 at the first end 14 of the conversion chamber 12 by a reciprocating ram 38 driven by a hydraulic cylinder 40. The force of the ram builds up a plug 41 which prevents the escape of the liquid bath 20 from the conversion chamber 12. In other embodiments, the feeder 32 can be a screw extruder or other suitable means. The pieces of plastic 10 then float upward in the molten lead bath 20 where they are engaged by an auger 42 which extends along the conversion chamber 12 from the first end 14 and is partially immersed in the molten lead bath 20. The auger 42 has a flight extending helically around a central shaft 46. The auger 42 is rotated continually by a motor (not shown) through a drive pulley 48 on the central shaft 46 which extends out through the first end 14 of the conversion chamber 12. As best seen in FIG. 2, in this embodiment of the invention a solids retaining screen 50 having a semicircular cross-section fits around an upper portion 52 of the auger 42 with a small space between it and the auger flight to prevent the floating solids accumulating along the sides 54 of the conversion chamber. The screen 50 has a mesh small enough to retain the solids, but large enough to allow vapor to flow through and in this embodiment is a VEE (Trade Mark of Johnson Filtration System for V-shaped wire screens) screen.

Figure 3A:
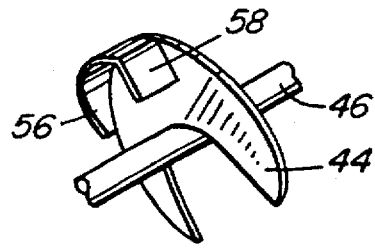
FIG. 3A is an isometric view of a portion of the auger seen in FIGS. 1 and 2.
Figure 3B:
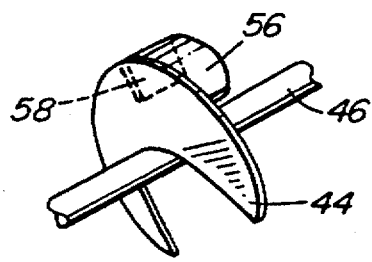
FIG. 3B is a similar view from the opposite side.

In use, the apparatus is assembled as shown and pieces 10 of plastic are fed in with the ram activated to build up the plug 41. After the vapor collection portion 24 of the collection chamber 12 above the molten lead bath 20 is purged with an inert gas to remove substantially all of the oxygen therefrom the molten lead bath 20 is heated to a predetermined temperature. Pieces of plastic 10 are then loaded into the hopper 34 from which they are continually fed into the molten lead bath 20 in the conversion chamber 12 through inlet 36 by the feeder 32. The pieces of plastic 10 are heated and gradually converted by pyrolysis to hydrocarbon vapor as they float upwardly to the surface 22 of the molten lead bath 20 and are carried along by the auger 42. The hot hydrocarbon vapor rises in the vapor collection portion 24 of the conversion chamber 12 upwardly through the screen 50 to the outlet 26 and then to the hydrocarbon condenser 30 for recovery. As best seen in FIGS. 3A and 3B, in this embodiment the auger flight 44 has a number of curved plough portions 56 spaced along it. These plough portions 56 extend at 90° from the outer edge of auger flight 44 and have a trailing tip 58 to catch the pieces of plastic 10 floating on the surface 22 of the molten lead bath 20 as the auger 42 rotates. This reimmerses the pieces of plastic 10 in the molten lead bath 20 as the plough portions 56 rotate downwardly and then releases them under the surface 22 of the molten lead bath 20 as they rotate upwardly. This constant reimmersion of the pieces of plastic 10 expedites conversion and avoids the formation of larger lumps of solids.

Figure 4:
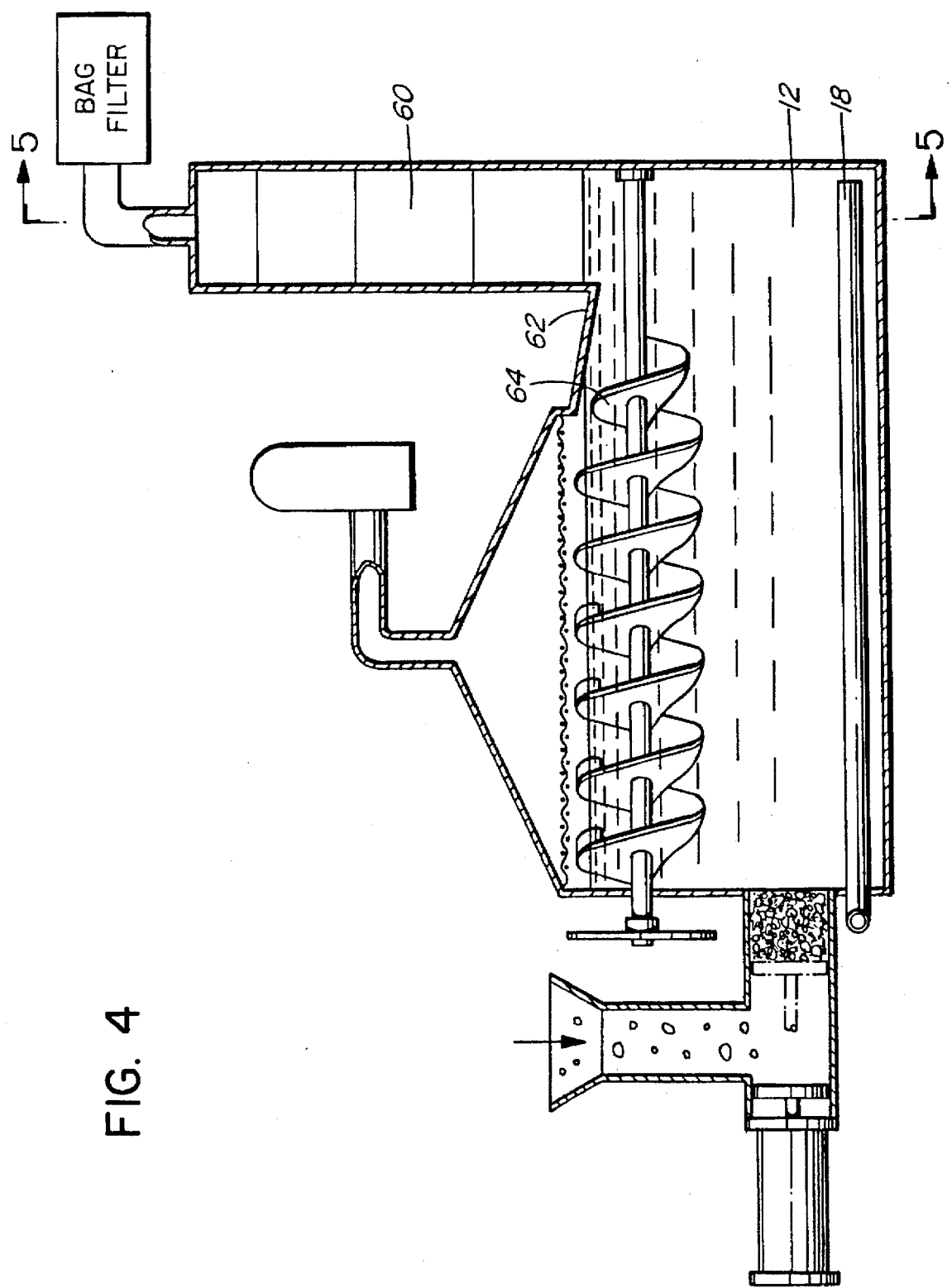
FIG. 4 is a view similar to FIG. 1 of apparatus also having a separation chamber according to another embodiment of the invention.
Figure 5:
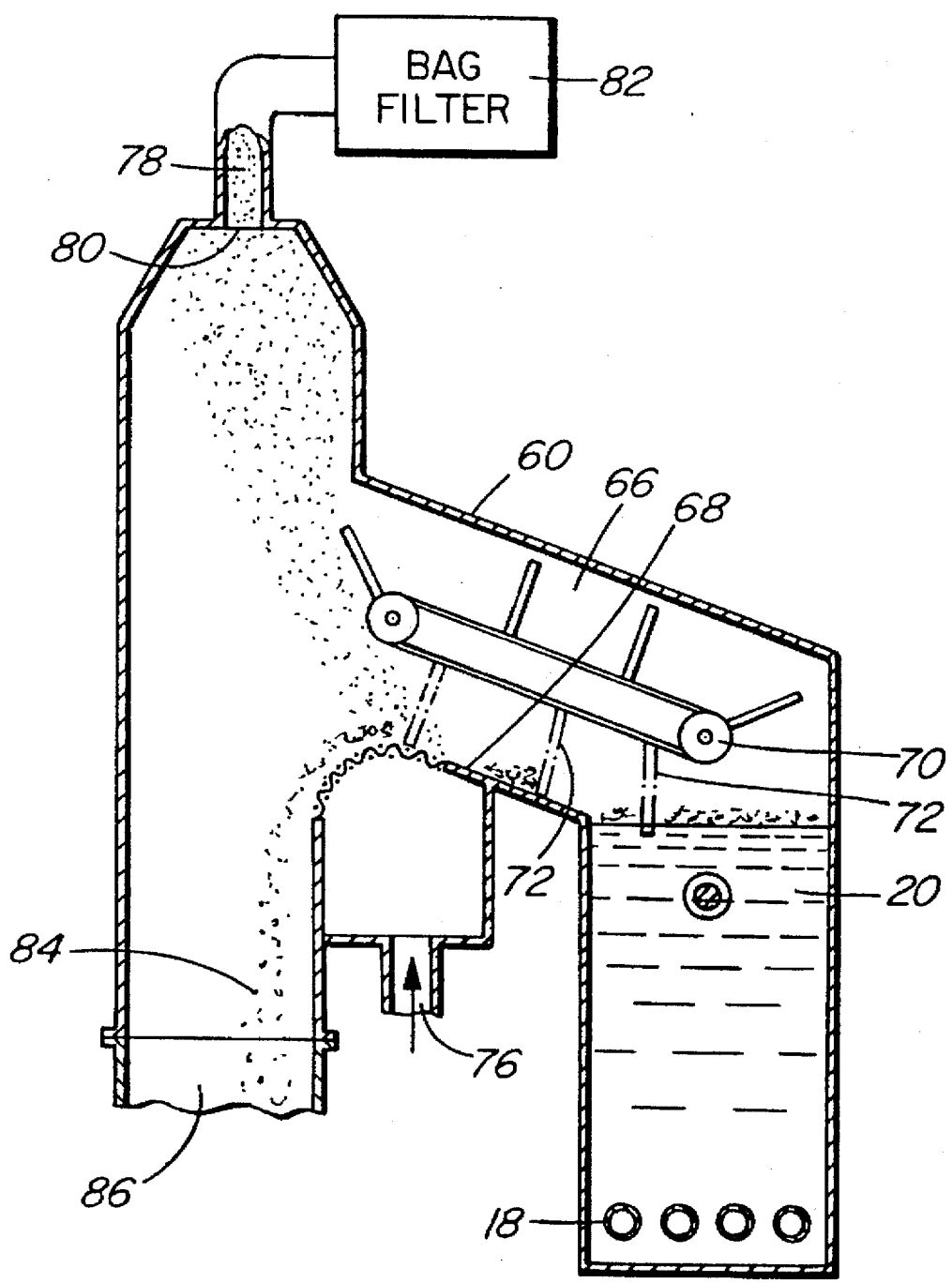
FIG. 5 is a cross-sectional view along line 5—5 in FIG. 4.

Reference is now made to FIGS. 4 and 5 in describing another embodiment of the invention in which pieces of solids containing hydrocarbon such as used vehicle tires are thermally converted to hydrocarbon vapor, hydrocarbon particulate matter such as carbon black, and residual solids such as steel belt from the tires. As many elements are the same or similar to those described above, their description will not be repeated and elements common to both embodiments will be described and illustrated using the same reference numerals. In this case, the molten lead bath 20 also extends into a separation chamber 60 which extends from the second end 16 of the conversion chamber 12 with a vapor retaining skirt 62 extending therebetween. The auger 42 has an inwardly tapered portion 64 which extends under the downwardly inclined skirt 62. Thus, the carbon black and steel belt left after the hydrocarbon vapor has been removed are forced by the action of the auger 42 under the inclined skirt 62 and into the separation chamber 60 without allowing the hydrocarbon vapor to escape from the vapour collection portion 24 of the conversion chamber 12 into the separation chamber 60. As best seen in FIG. 5, the separation chamber 60 has a mid-portion 66 which extends along a beach or surface 68 inclined upwardly out of the molten lead bath 20. The separation chamber 60 has a scraper mechanism 70 with a number of spaced blades 72 which travel in a continuous cycle through a portion of the lead bath 20 and up along the inclined surface 68 to draw the carbon black and steel belt floating on the molten lead bath 20 upwardly along the inclined surface 68.

In this embodiment, the inclined surface 68 has at least an upper portion 74 formed of the VEE screen and an inert gas purge 76 blowing upwardly through the screen 74 to remove the carbon black 78 from the steel belt through an upwardly extending particulate matter outlet 80 leading to a collector 82 such as a bag filter. The remaining steel belt 84 then drop downwardly from the inclined surface 68 to a residual solids outlet 86 where they are collected. In addition to removing the particulate matter 78, the inert gas purge 76 also keeps the separation chamber 60 substantially free of oxygen. While, in this embodiment, the blades 72 travel along the stationary inclined surface 68, in other embodiments an inclined conveyer can be used to draw the remaining particulate matter 78 and residual solids 84 out of the molten lead bath 20.

While the description of the thermal processing apparatus has been given with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. In thermal processing apparatus for thermally converting solids containing hydrocarbon to vapor, particulate matter and residual solids comprising an elongated conversion chamber with a first and a second end, the conversion chamber being filled to a predetermined level with a heated liquid bath having an upper surface and a predetermined temperature, the improvement comprising:

feed means to continually feed pieces of the solids composed of plastic products and/or vehicle tires containing hydrocarbon into the liquid bath through an inlet disposed below the upper surface of the liquid bath at the first end of the conversion chamber whereby the pieces of solids float to the upper surface of the heated liquid bath;

an auger partially immersed in the heated liquid bath extending from the first end of the conversion chamber continually move the pieces of solids floating on the upper surface of the heated liquid bath along and in the surface of the heated liquid bath in the elongated conversion chamber sufficiently to convert the hydrocarbon in the solids to vapor;

a substantially oxygen free vapor collection portion extending above the upper surface of the liquid bath to a vapor outlet for collecting said vapor;

a separation chamber extending from the second end of the conversion chamber, the heated liquid bath extending into the separation chamber; a vapor retaining skirt inclined downwardly into the heated liquid bath between the conversion chamber and the separation chamber to form a seal for preventing the vapor escaping from the vapor collection portion of the conversion chamber into the separation chamber while the particulate matter and residual solids remaining in the conversion chamber after removal of the vapor are forced by the auger downwardly into the heated liquid bath beneath the inclined skirt into the separation chamber;

separation means in the separation chamber for removing the particulate matter and residual solids from the heated liquid bath and for separating the particulate matter from the residual solids, with the particulate matter flowing to a particulate matter collector and the residual solids dropping downwardly to a residual solids outlet.

2. Thermal processing apparatus as claimed in claim 1 wherein the separation means comprises an inclined surface along which the particulate matter and residual solids are drawn upwardly out of the heated liquid bath and from which the residual solids are dropped to the residual solids outlet, at least a portion of the surface being a screen through which an inert gas is blown upwardly to the particulate matter collector to separate the particulate matter from the residual solids.

3. Thermal processing apparatus as claimed in claim 2 further comprising;

scraper means mounted in the separation chamber having a plurality of spaced blades travelling in a continuous cycle through a portion of the heated liquid bath and up along the inclined surface to draw the particulate matter and residual solids floating in the heated liquid bath upward along the inclined surface.

4. Thermal processing apparatus as claimed in claim 3 further comprising heating pipes extending through the heated liquid bath in the conversion chamber and the separation chamber for heating the liquid bath to the predetermined temperature.

5. Thermal processing apparatus as claimed 4 wherein the liquid bath is of molten lead is heated to a predetermined temperature of between 850° F. and 950° F.

6. Thermal processing apparatus as claimed in claim 1 wherein the feed means includes a ram which compresses the pieces of solids into a plug as the pieces of solids are forced through the inlet into the liquid bath, said plug being sufficient to prevent the escape of the liquid bath from the conversion chamber.

7. Thermal processing apparatus as claimed in claim 1, wherein said auger has flights immersed in the heated liquid bath sufficiently so as to cause the pieces of solids floating on the upper surface to be constantly reimmersed into the heated liquid bath and released under the upper surface thereof for refloating to the upper surface as pieces of solids are moved along the upper surface.

8. Thermal processing apparatus as claimed in claim wherein said flights comprise at least one helical flight extending from a central shaft, the flight having a plurality of plough portions spaced therealong, the plough portions being shaped and extending at an angle from the flight sufficient to reimmerse the pieces of solids in the heated liquid bath as the auger revolves.

* * * * *